(12) United States Patent
Jiang et al.

(10) Patent No.: US 11,809,588 B1
(45) Date of Patent: Nov. 7, 2023

(54) PROTECTING MEMBERSHIP IN MULTI-IDENTIFICATION SECURE COMPUTATION AND COMMUNICATION

(71) Applicant: Lemon Inc., Grand Cayman (KY)

(72) Inventors: Bo Jiang, Culver City, CA (US); Jian Du, Culver City, CA (US); Haohao Qian, Beijing (CN); Qiang Yan, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/297,389

(22) Filed: Apr. 7, 2023

(51) Int. Cl.
*G06F 21/62* (2013.01)
*G06F 16/2455* (2019.01)

(52) U.S. Cl.
CPC ...... *G06F 21/6218* (2013.01); *G06F 16/2456* (2019.01); *G06F 16/24556* (2019.01)

(58) Field of Classification Search
None
See application file for complete search history.

(56) References Cited

U.S. PATENT DOCUMENTS

| | | |
|---|---|---|
| 7,058,603 B1 | 6/2006 | Rhiando |
| 9,652,622 B2 | 6/2017 | Garfinkle et al. |
| 10,289,816 B1 | 5/2019 | Malassenet |
| 11,522,688 B2 | 12/2022 | Goodsitt et al. |
| 11,593,510 B1 | 2/2023 | Knox |
| 11,704,431 B2 | 7/2023 | Kraus |
| 2004/0179686 A1 | 9/2004 | Matsumura |
| 2010/0131764 A1 | 5/2010 | Goh |
| 2011/0202764 A1 | 8/2011 | Furukawa |
| 2012/0143922 A1 | 6/2012 | Rane |
| 2013/0212690 A1 | 8/2013 | Fawaz |
| 2016/0150047 A1 | 5/2016 | O'Hare |
| 2018/0101697 A1 | 4/2018 | Rane |

(Continued)

FOREIGN PATENT DOCUMENTS

CN 116049626 A 5/2023

OTHER PUBLICATIONS

Buddhavarapu et al., "Private matching for compute", Cryptology ePrint Archive, 2020, https://eprint.iacr.org/2020/599.

(Continued)

*Primary Examiner* — Brandon Hoffman
(74) *Attorney, Agent, or Firm* — HAMRE, SCHUMANN, MUELLER & LARSON, P.C.

(57) ABSTRACT

Methods and systems for protecting membership privacy in multi-identification secure computation and communication are provided. The method includes providing a dataset having a first set of membership identifications and a second set of membership identifications, determining a number N based on a data privacy configuration, generating and shuffling a first padding dataset, and up-sampling the first set of membership identifications with a first N elements of the shuffled first padding dataset. The method also includes inserting a first N random membership-identification elements to the second set of membership identifications, generating and shuffling a second padding dataset, up-sampling the inserted second set of membership identifications with a first N elements of the shuffled second padding dataset. The method further includes performing an intersection operation based on the up-sampled dataset and a received dataset.

20 Claims, 6 Drawing Sheets

(56) References Cited

U.S. PATENT DOCUMENTS

| | | |
|---|---|---|
| 2019/0065775 A1 | 2/2019 | Klucar, Jr |
| 2019/0244138 A1 | 8/2019 | Bhowmick |
| 2019/0361794 A1 | 11/2019 | Maksyutov |
| 2020/0250335 A1 | 8/2020 | Hockenbrocht |
| 2020/0401726 A1 | 12/2020 | Lim et al. |
| 2021/0073677 A1 | 3/2021 | Peterson |
| 2021/0173856 A1 | 6/2021 | Chitnis |
| 2021/0336771 A1 | 10/2021 | Mukherjee |
| 2021/0360010 A1 | 11/2021 | Zaccak |
| 2021/0399874 A1 | 12/2021 | Polyakov |
| 2022/0100899 A1 | 3/2022 | Saillet |
| 2022/0138348 A1 | 5/2022 | Bernau |
| 2022/0244988 A1 | 8/2022 | Zhang |
| 2022/0277097 A1 | 9/2022 | Cabot |
| 2022/0335450 A1 | 10/2022 | Fenton |
| 2022/0405800 A1 | 12/2022 | Walcott |
| 2023/0045553 A1 | 2/2023 | Deshpande |
| 2023/0125887 A1* | 4/2023 | Habite ............... G06N 3/0475 382/103 |
| 2023/0146259 A1* | 5/2023 | Liktor ............... G06T 3/0093 382/299 |
| 2023/0017374 A1 | 6/2023 | Boehler |
| 2023/0214684 A1 | 7/2023 | Wang |

OTHER PUBLICATIONS

Guo et al., "Birds of a Feather Flock Together: How Set Bias Helps to Deanonymize You via Revealed Intersection Sizes", 31st USENIX Security Symposium, Aug. 10-12, 2022, Boston, MA, USA, https://www.usenix.org/conference/usenixsecurity22/presentation/guo.

Ion et al., "On Deploying Secure Computing: Private Intersection-Sum-with-Cardinality", 2020 IEEE European Symposium on Security and Privacy (EuroS&P), Date of Conference: Sep. 7-11, 2020, Date added to IEEE Xplore: Nov. 2, 2020, https://www.researchgate.net/publication/346584438_On_Deploying_Secure_Computing_Private_Intersection-Sum-with-Cardinality.

Chandran et al., "Circuit-PSI with Linear Complexity via Relaxed Batch OPPRF", Cryptology ePrint Archive, received Jan. 12, 2021, https://eprint.iacr.org/2021/034.

Pinkas et al., "SpOT-Light: Lightweight Private Set Intersection from Sparse OT Extension", Cryptology ePrint Archive, https://eprint.iacr.org/2019/634.

Chase et al., "Secret Shared Shuffle", Cryptology ePrint Archive, https://eprint.iacr.org/2019/1340.

Mohassel et al., "How to Hide Circuits in MPC: An Efficient Framework for Private Function Evaluation", Cryptology ePrint Archive, https://eprint.iacr.org/2013/137.

Garimella et al., "Private Set Operations from Oblivious Switching", Cryptology ePrint Archive, https://eprint.iacr.org/2021/243.

Dwork et al., "Differential Privacy and Robust Statistics", Association for Computing Machinery, May 31, 2009, pp. 371-380, https://dl.acm.org/doi/10.1145/1536414.1536466.

Dwork et al., "Differential Privacy Under Continual Observation", Association for Computing Machinery, Jun. 5, 2010, pp. 715-724, https://dl.acm.org/doi/10.1145/1806689.1806787.

Dwork et al. "Our Data, Ourselves: Privacy via Distributed Noise Generation", Advances in Cryptology—EUROCRYPT 2006: 24th Annual International Conference on the Theory and Applications of Cryptographic Techniques, St. Petersburg, Russia, May 28-Jun. 1, 2006. Proceedings 25. Springer Berlin Heidelberg, 2006, https://doi.org/10.1007/11761679_29.

Office Action dated Jun. 12, 2023 issued in the corresponding U.S. application U.S. Appl. No. 18/297,376.

Office Action dated Aug. 3, 2023 issued in the corresponding U.S. Appl. No. 18/297,339.

Office Action dated Jun. 14, 2023 issued in the corresponding U.S. Appl. No. 18/297,405.

Notice of Allowance dated Aug. 30, 2023 issued in the corresponding U.S. Appl. No. 18/297,405.

Kairouz, Peter, Sweoong Oh, and Pramod Viswanath. "The composition theorem for differential privacy." International Conference on machine learning. PMLR, 2015 (Year: 2015).

Office Action dated Jun. 20, 2023 issued in the corresponding U.S. Appl. No. 18/297,424.

Notice of Allowance dated Aug. 2, 2023 issued in the corresponding U.S. Appl. No. 18/297,424.

Office Action dated Jul. 12, 2023 issued in the corresponding U.S. Appl. No. 18/297,447.

Du et al. DP-PSI: Private and secure set intersection, Aug. 28, 2022, Cornel University, https://doi.org/10.48550/ arXiv.2208.13249V1, p. 1-9. (Year: 2022).

Notice of Allowance dated Jul. 25, 2023 issued in the corresponding U.S. Appl. No. 18/297,530.

Notice of Allowance dated Aug. 2, 2023 issued in the corresponding U.S. Appl. No. 18/297,545.

* cited by examiner

PROTECTING MEMBERSHIP IN MULTI-IDENTIFICATION SECURE COMPUTATION AND COMMUNICATION

FIELD

The embodiments described herein pertain generally to protecting membership privacy for secure computation and communication. More specifically, the embodiments described herein pertain to protecting membership (of an element, a member, a user, etc.) from being identified via an intersection size in multi-identification private set intersection algorithms or protocols.

BACKGROUND

Private set intersection (PSI) is a secure two- or multi-party protocol by which intersection-related statistics are computed, and PSI has garnered significant industry interest. PSI algorithms or protocols permit two or more organizations to jointly compute a function (e.g., count, sum, etc.) over the intersection of their respective data sets without revealing to other party the intersection explicitly. In an application, two parties may be unwilling or unable to reveal the underlying data to each other, but they may still want to compute an aggregate population-level measurement. The two parties may want to do so while ensuring that the input data sets reveal nothing beyond these aggregate values about individual users.

SUMMARY

Many datasets have more than one identification category or field. Executing algorithms that implement the PSI protocol on each identification category may ultimately reveal the intersection size between datasets of two or more parties. However, an attacker into the data communication may be able to use the revealed intersection size to infer the set membership of some elements belonging to a single organization. Disclosure of an element's membership in the dataset of one organization to another organization may risk violating privacy regulations, since the disclosure may be considered as identifying or tracking of one or more people between organizations.

Features in the embodiments disclosed herein may avoid the situations described above by providing a membership (of an element, a member, a user, etc.) protection scheme or algorithm based on e.g., a differential privacy (DP) protocol for multi-identification configurations. Features in the embodiments disclosed herein may generate dummy (padding or filling) membership-identification elements for each identification category in each party's dataset independently following a pre-calibrated distribution of noise, add the dummy elements to each dataset, and execute an algorithm based on a PSI protocol. Further features in the embodiments disclosed herein may lead to the intersection size revealed in the following PSI protocol being random and differentially private, making it almost impossible for an attacker to determine a user's membership to a dataset or organization.

In one example embodiment, a method for protecting membership privacy in multi-identification secure computation and communication is provided. The method includes providing a first dataset, the first dataset having a first set of membership identifications and a second set of membership identifications; determining a number N based on a data privacy configuration; generating a first padding dataset; shuffling the first padding dataset; up-sampling the first set of membership identifications with a first N elements of the shuffled first padding dataset; inserting a first N random membership-identification elements to the second set of membership identifications; generating a second padding dataset; shuffling the second padding dataset; up-sampling the inserted second set of membership identifications with a first N elements of the shuffled second padding dataset; and performing an intersection operation based on the up-sampled first dataset and a received dataset.

In another example embodiment, a membership privacy protection system in multi-identification secure computation and communication is provided. The system includes a memory to store a first dataset and a processor. The processor is to provide a first dataset, the first dataset having a first set of membership identifications and a second set of membership identifications; determine a number N based on a data privacy configuration; generate a first padding dataset having 2*N elements, where an intersection of the first padding dataset and the first set of membership identifications is empty; shuffle the first padding dataset; up-sample the first set of membership identifications with a first N elements of the shuffled first padding dataset; insert a first N random membership-identification elements to the second set of membership identifications; generate a second padding dataset having 2*N elements, where an intersection of the second padding dataset and the second set of membership identifications is empty; shuffle the second padding dataset; up-sample the inserted second set of membership identifications with a first N elements of the shuffled second padding dataset; perform an intersection operation based on the up-sampled first dataset and a received dataset.

In yet another example embodiment, a non-transitory computer-readable medium having computer-executable instructions stored thereon is provided. The instructions, upon execution, cause one or more processors to perform operations including providing a first dataset, the first dataset having a first set of membership identifications and a second set of membership identifications, the first set of membership identifications having a priority higher than a priority of the second set of membership identifications; up-sampling the first dataset with a padding dataset; providing a second dataset, the first dataset having a third set of membership identifications and a fourth set of membership identifications, the third set of membership identifications having a priority higher than a priority of the fourth set of membership identifications; up-sampling the second dataset with the padding dataset; for each membership identification in the first set of membership identifications that matches a membership identification in the third set of membership identifications, removing a row containing the matched membership identification from the first data set and adding the removed row to a first intersection; and for each membership identification in the second set of membership identifications that matches a membership identification in the fourth set of membership identifications, removing a row containing the matched membership identification from the first dataset and adding the removed row to the first intersection.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
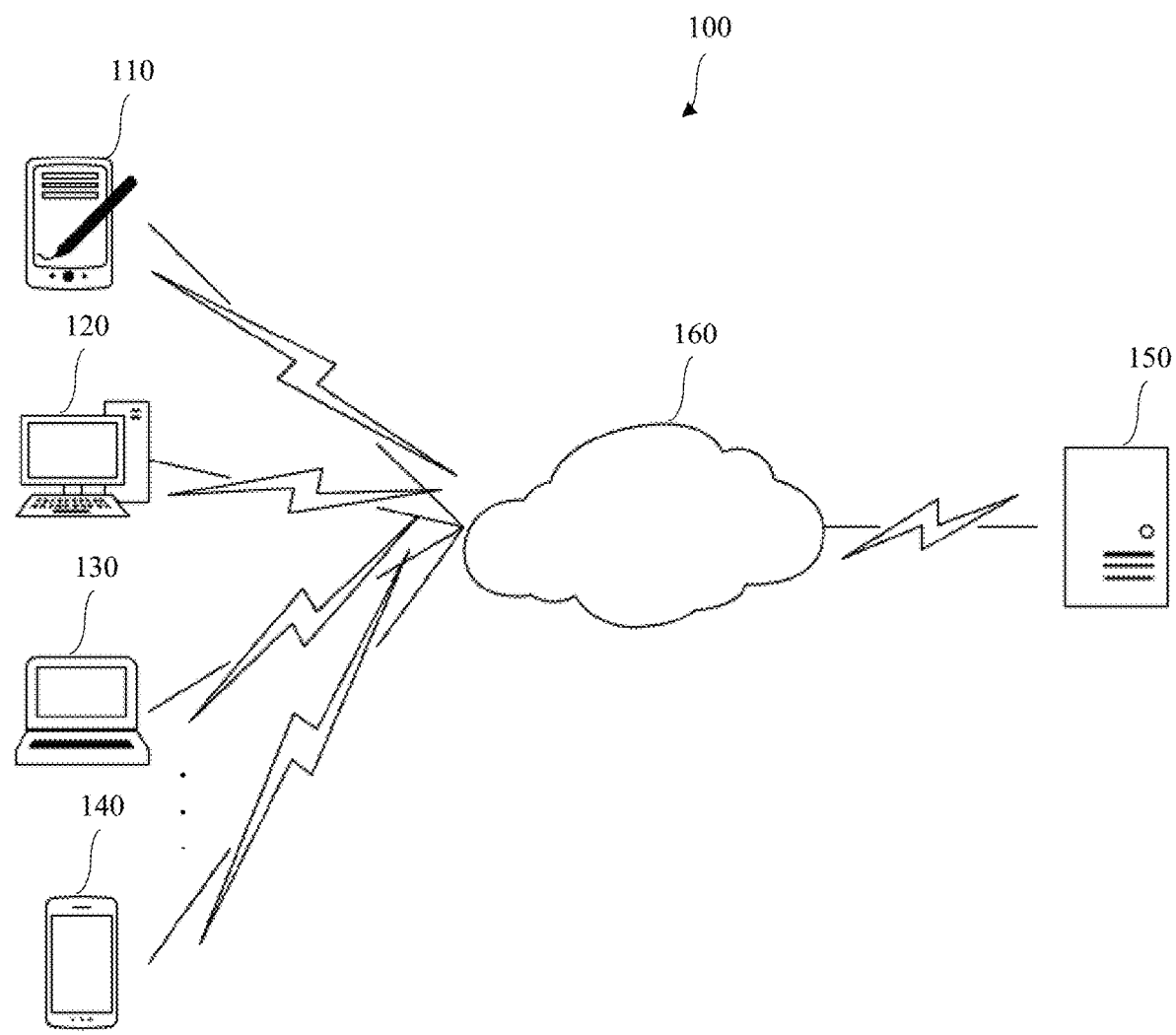
FIG. 1 is a schematic view of an example multi-identification membership privacy protection system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" is a term of art and may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's unique ID, user's name, e-mail address, phone numbers, etc.), and/or one or more attributes or features or values associated with the one or more identifications. It is to be understood that any user's identification(s) and/or user's data described in this document are allowed, permitted, and/or otherwise authorized by the user for use in the embodiments described herein and in their proper legal equivalents as understood by those of skill in the art.

As referenced herein, "inner join" or "inner-join" is a term of art and may refer to an operation or function that includes combining records from datasets, particularly when there are matching values in a field common to the datasets. For example, an inner join may be performed with a "Departments" dataset and an "Employees" dataset to determine all the employees in each department. It is to be understood that in the resulting dataset (i.e., the "intersection") of the inner join operation, the inner join may contain the information from both datasets that is related to each other. An outer join, on the other hand, may also contain information that is not related to the other dataset in its resulting dataset. A private inner join may refer to an inner join operation of datasets of two or more parties that does not reveal the data in the intersection of datasets of the two or more parties.

As referenced herein, "hashing" may refer to an operation or function that transforms or converts an input (a key such as a numerical value, a string of characters, etc.) into an output (e.g., another numerical value, another string of characters, etc.). It is to be understood that hashing is a term of art and may be used in cyber security application(s) to access data in a small and nearly constant time per retrieval.

As referenced herein, "MPC" or "multi-party computation" is a term of art and may refer to a field of cryptography with the goal of creating schemes for parties to jointly compute a function over the joint input of the parties while keeping respective input private. It is to be understood that, unlike traditional cryptographic tasks where cryptography may assure security and integrity of communication or storage when an adversary is outside the system of participants (e.g., an eavesdropper on the sender and/or the receiver), the cryptography in MPC may protect participants' privacy relative to each other.

As referenced herein, "ECC" or "elliptic-curve cryptography" is a term of art and may refer to a public-key cryptography based on the algebraic structure of elliptic curves over finite fields. It is to be understood that the ECC may allow smaller keys compared to non-EC cryptography to provide equivalent security. It is also to be understood that "EC" or "elliptic curve" may be applicable for key agreement, digital signatures, pseudo-random generators, and/or other tasks. Elliptic curves may be indirectly used for encryption by combining a key agreement between/among the parties with a symmetric encryption scheme. Elliptic curves may also be used in integer factorization algorithms based on elliptic curves that have applications in cryptography.

As referenced herein, "elliptic-curve Diffie-Hellman" or "ECDH" is a term of art and may refer to a key agreement protocol or a corresponding algorithm that allows two or more parties, each having an elliptic-curve public-private key pair, to establish a shared secret over an unsecured channel. It is to be understood that the shared secret may be directly used as a key or to derive another key. It is also to be understood that the key, or the derived key, may then be used to encrypt or encode subsequent communications using a symmetric-key cipher. It is further to be understood that ECDH may refer to a variant of the Diffie-Hellman protocol using elliptic-curve cryptography.

As referenced herein, "shuffle", "shuffling", "permute", or "permuting" is a term of art and may refer to an action or algorithm for randomly rearranging the order of the records (elements, rows, etc.) of e.g., an array, a dataset, a database, a data table, etc.

As referenced herein, "differential privacy" or "DP" is a term of art and may refer to a protocol, a system, or an algorithm for publicly sharing information regarding a dataset by describing the patterns of groups of elements within the dataset while withholding information about individual users listed in the dataset. It is to be understood that for differential privacy, if the effect of making an arbitrary single substitution of a user's record in the dataset is smaller than a desired or predetermined threshold, the query result cannot be used to infer much about any single individual user, and therefore provides privacy. It is to also be understood that differential privacy may refer to a constraint on the algorithms used to publish aggregate information about a statistical dataset or database, which limits the disclosure of private information of records for individuals whose information is in the dataset or database.

As referenced herein, a "randomized algorithm" for DP is a term of art and may refer to an algorithm that employs a degree of randomness as part of its logic or procedure. It is to be understood that a randomized algorithm typically uses uniformly random bits as an auxiliary input to guide its behavior, for achieving good performance over all possible random choices determined by the random bits; thus either the running time, or the output, or both, are random variables.

As referenced herein, "private set intersection" is a term of art and may refer to a secure multi-party computation cryptographic operation, algorithm, or function by which two or more parties holding respective datasets compare encrypted versions of these datasets in order to compute the intersection. It is to be understood that for private set intersection, neither party reveals data elements to the counterparty except for the elements in the intersection.

As referenced herein, "secret sharing" or "secret splitting" is a term of art and may refer to cryptographic functions or algorithms for generating a secret, breaking the secret into multiple shares, and distributing the shares among multiple parties, so that only when the parties bring together their respective shares can the secret be reconstructed. It is to be understood that secret sharing may refer to functions or algorithms for distributing a secret among a group, in such a way that no individual holds any intelligible information about the secret, but when a sufficient number of individuals combine their "shares", the secret may be reconstructed. It is also to be understood that whereas unsecure secret sharing may allow an attacker to gain more information with each share, secure secret sharing may be "all or nothing", whereas "all" may mean the necessary number of shares.

FIG. 1 is a schematic view of an example multi-identification membership privacy protection system 100, arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as social media applications, online shopping services, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2A:
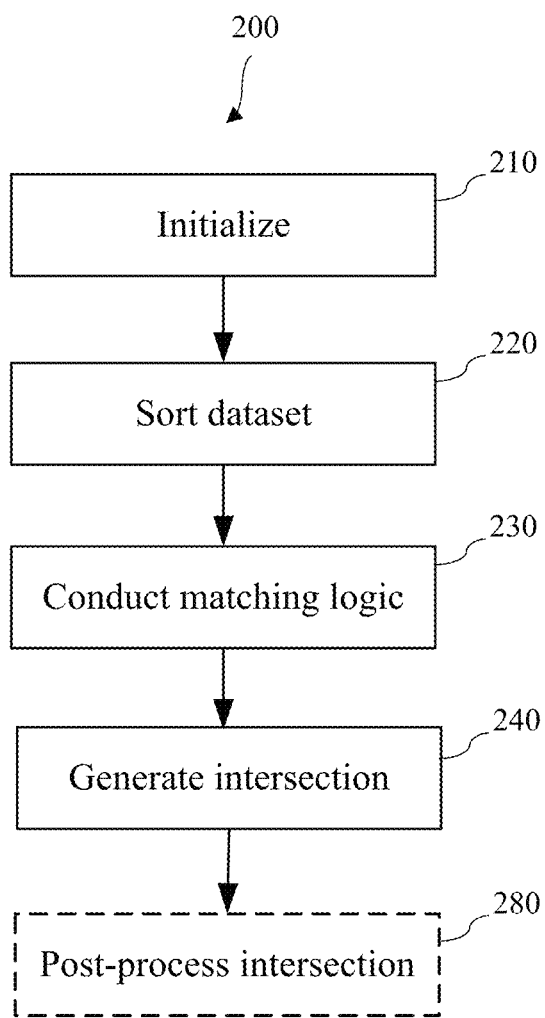
FIG. 2A is a flow chart illustrating an example processing flow for a multi-identification matching algorithm, in accordance with at least some embodiments described herein.
Figure 2B:
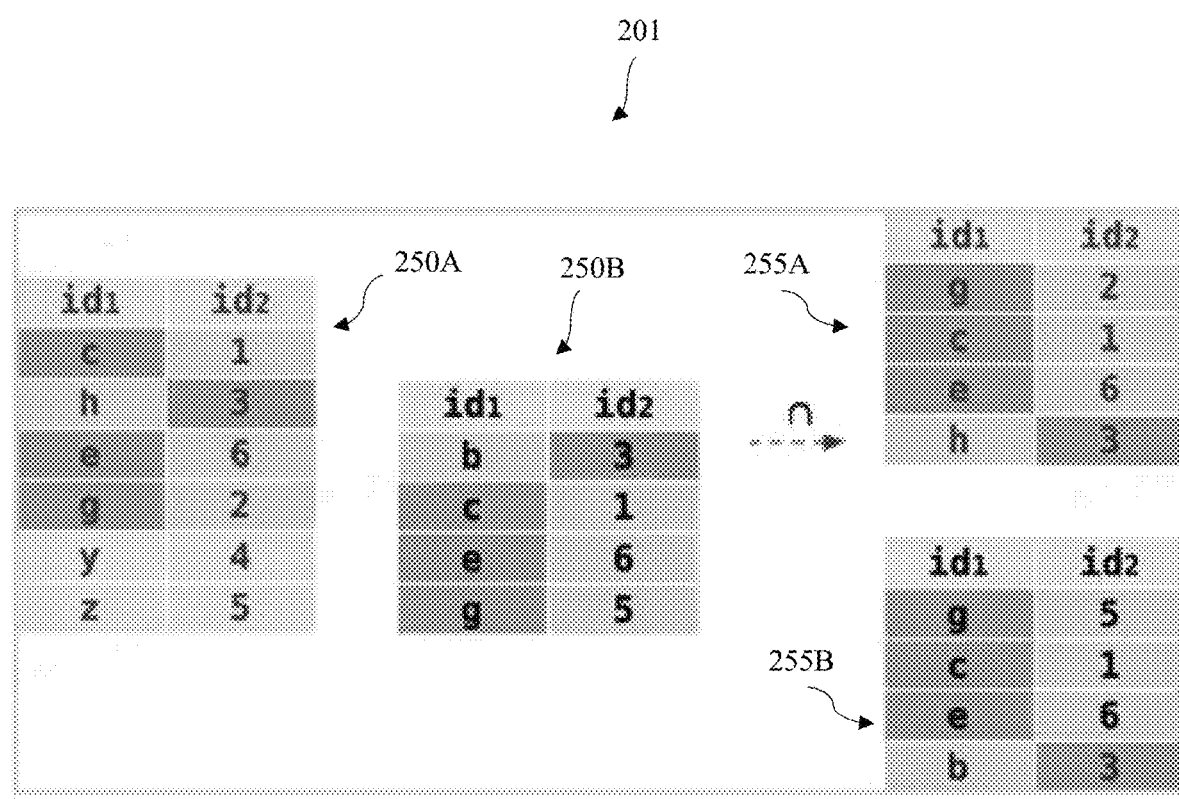
FIG. 2B is a schematic diagram illustrating an example of the processing flow of FIG. 2A, in accordance with at least some embodiments described herein.

FIG. 2A is a flow chart illustrating an example processing flow 200 for a multi-identification matching algorithm, in accordance with at least some embodiments described herein. FIG. 2B is a schematic diagram 201 illustrating an example of the processing flow of FIG. 2A, in accordance with at least some embodiments described herein.

Figure 4:
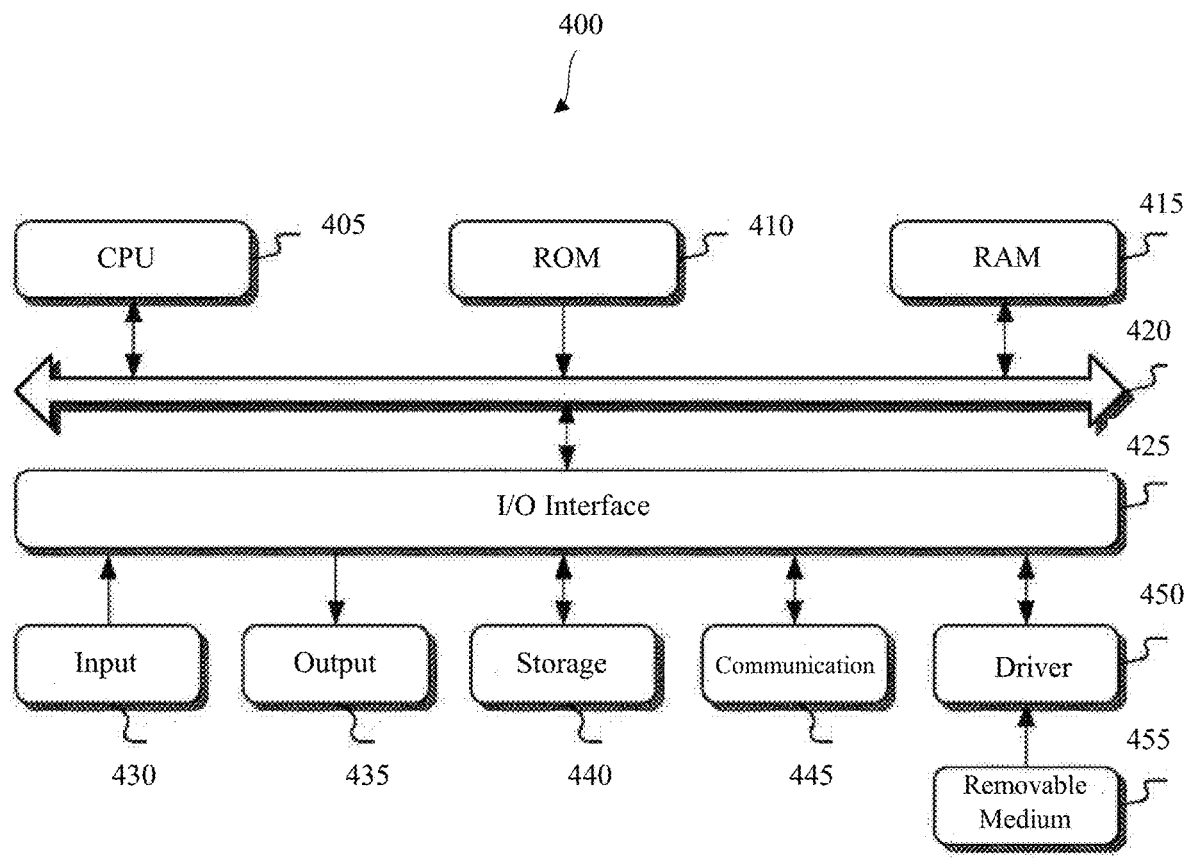
FIG. 4 is a schematic structural diagram of an example computer system applicable to implementing an electronic device, arranged in accordance with at least some embodiments described herein.

It is to be understood that the processing flow 200 disclosed herein can be conducted by one or more processors (e.g., the processor of one or more of the terminal device 110, 120, 130, and 140 of FIG. 1, the processor of the server 150 of FIG. 1, the central processor unit 405 of FIG. 4, and/or any other suitable processor), unless otherwise specified.

It is also to be understood that the processing flow 200 can include one or more operations, actions, or functions as illustrated by one or more of blocks 210, 220, 230, 240, and 280. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 200 may begin at block 210.

At block 210 (Initialize), the processor for a respective device may perform initialization functions or operations for, e.g., system parameters and/or application parameters. The processor of the respective device may provide a dataset (e.g., 250A of FIG. 2B) for Party A, and/or provide a dataset (e.g., 250B of FIG. 2B) for Party B. It is to be understood that the datasets 250A and/or 250B may be the up-sampled datasets (e.g., 390 of FIG. 3B, etc.) generated or obtained at block 340 of FIG. 3A, described in detail further below.

It is also to be understood that each dataset 250A or 250B may include more than one identification (ID) field or column, and that the number of the identification fields or columns of the dataset 250A may or may not be equal to the number of the identification fields or columns of the dataset 250B. As shown in FIG. 2B, each of the datasets 250A and 250B includes two ID fields: id1 and id2.

In an example embodiment, the processor of the respective device may shuffle the dataset 250A for Party A, and/or shuffle the dataset 250B for Party B. The processor may also transform the ID fields of the dataset 250A using a transforming scheme for Party A.

It is to be understood that the function or operation to "transform" or of "transforming" a dataset or a portion thereof, e.g., one or more fields/columns (or records/rows) of a dataset such as one or more ID fields/columns (or records/rows), etc., may refer to processing (e.g., encrypting, decrypting, encoding, decoding, manipulating, compressing, decompressing, converting, etc.) the dataset or a portion thereof. It is also to be understood that the "transforming scheme" may refer to an algorithm, protocol, or function of performing the processing (e.g., encrypting, decrypting, encoding, decoding, manipulating, compressing, decompressing, converting, etc.) of the dataset or a portion thereof. In an example embodiment, the processor may encrypt (or decrypt, encode, decode, manipulate, compress, decompress, convert, etc.) the ID fields of the dataset 250A using e.g., a key of Party A based on an ECDH algorithm or protocol.

The processor may also transform the ID fields of the dataset 250B using a transforming scheme for Party B. In an example embodiment, the processor may encrypt (or decrypt, encode, decode, manipulate, compress, decompress, convert, etc.) the ID fields of the dataset 250B using e.g., a key of Party B based on the ECDH algorithm or protocol.

It is to be understood that for Party A and/or Party B, a sequence of the transforming of the ID fields of the dataset (250A or 250B) and the shuffling of the dataset (250A or 250B) may be switched or changed, without impacting the purpose of the resultant dataset.

The processor of the respective device may further exchange the dataset 250A with the dataset 250B between Party A and Party B. For Party A, the processor may dispatch or send the dataset 250A to Party B, and receive or obtain the dataset 250B from Party B. For Party B, the processor may dispatch or send the dataset 250B to Party A, and receive or obtain the dataset 250A from Party A. It is to be understood that since the dataset 250A and the dataset 250B have been transformed (e.g., encoded, etc.), the corresponding receiving party may not know the real data in the received dataset. It is to be understood that each Party may now have a local copy of both the dataset 250A and the dataset 250B.

The processor of the respective device may further transform the ID fields of the received transformed dataset 250B using a transforming scheme for Party A. In an example embodiment, the processor may encrypt (or decrypt, encode, decode, manipulate, compress, decompress, convert, etc.) the ID fields of the received transformed dataset 250B using a key of Party A based on the ECDH algorithm or protocol. The processor of the respective device may further transform the ID fields of the received transformed dataset 250A using a transforming scheme for Party B. In an example embodiment, the processor may encrypt (or decrypt, encode, decode, manipulate, compress, decompress, convert, etc.) the ID fields of the received transformed dataset 250A using a key of Party B based on the ECDH algorithm or protocol.

The processor may also shuffle the transformed received transformed dataset 250A for Party B and/or the transformed received transformed dataset 250B for Party A. It is to be understood that for Party A and/or Party B, a sequence of the transforming of ID fields of the received transformed dataset (250A and/or 250B) and the shuffling of the transformed received transformed dataset (250A and/or 250B) may be switched or changed, without impacting the purpose of the resultant dataset. The processor of the respective device may exchange the resultant shuffled dataset 250A (referred to as "250A" in blocks 220-240 and 280, to simplify the description) and the resultant shuffled dataset 250B (referred to as "250B" in blocks 220-240 and 280, to simplify the description) between Party B and Party A. Processing may proceed from block 210 to block 220.

At block 220 (Sort dataset), the processor of the respective device may sort the dataset 250A and/or the dataset 250B for Party A and/or Party B. For example, for Party A, the processor may sort the ID fields (id1, id2, etc.) of the dataset 250A in an order (or sequence) corresponding to a predetermined importance or priority level of the ID fields. For example, the dataset 250A may contain ID fields such as the user's name (e.g., having a priority level of 3, etc.), e-mail address (e.g., having a priority level of 2, etc.), phone numbers (e.g., having a priority level of 4, etc.), user's unique ID (e.g., having a priority level of 1, etc.), etc. In an example embodiment, the lower the priority level number is, the more important the corresponding ID field is. In an example embodiment, sorting the ID fields of the dataset 250A may result in the user's unique ID (e.g., having a priority level of 1, etc.) being listed as the first field/column in the dataset 250A, the e-mail address (e.g., having a priority level of 2, etc.) being listed as the second field/column in the dataset 250A, the user's name (e.g., having a priority level of 3, etc.) being listed as the third field/column in the dataset 250A, and the phone numbers (e.g., having a priority level of 4, etc.) being listed as the fourth field/column in the dataset 250A. That is, in a non-limiting example of dataset 250A, the ID fields are sorted in ascending order of the number of the priority level: user's unique ID, email addresses, user names, and user phone numbers.

For Party B, the processor may sort the ID fields (id1, id2, etc.) of the dataset 250B in the same order (or sequence) corresponding to the predetermined importance or priority level of the ID fields, as the order for the dataset 250A for Party A. It is to be understood that the sorting of the datasets 250A and 250B is to prepare for the subsequent matching process. Processing may proceed from block 220 to block 230.

At block 230 (Conduct matching logic), with datasets 250A and 250B being sorted, the processor of the respective device may, for each ID field (starting from the ID field having the lowest priority level number, up to the ID field having the highest priority level number) of the dataset 250A, search for a match (or an inner join operation, etc.) between the dataset 250A and the dataset 250B to obtain or generate an intersection (dataset 255A of FIG. 2B) for Party A.

It is to be understood that the searching for a match operation (or an inner join operation, etc.) includes: for each ID field of the dataset 250A (starting from the ID field having the lowest priority level number, up to the ID field having the highest priority level number) and for each identification element in the dataset 250A that matches the identification element in the dataset 250B, removing the record (or row) of the dataset 250A that contains a matched identification element, and adding or appending the removed record (or row) of the dataset 250A to the dataset 255A.

For example, as shown in FIG. 2B, for the ID field id1 in the dataset 250A, the records/rows containing "g", "c", "e" each has a corresponding match in the dataset 250B and such records/rows may be removed from the dataset 250A; and the removed records/rows may be added or appended to the dataset 255A. For id2 in the dataset 250A, the record/row containing "3" has a corresponding match in the dataset 250B and such record/row may be removed from the dataset 250A; and the removed record/row may be added or appended to the dataset 255A.

The processor of the respective device may, for each ID field (starting from the ID field having the lowest priority level number up to the ID field having the highest priority level number) of the dataset 250B, search for a match (or an inner join operation, etc.) between the dataset 250A and the dataset 250B to obtain or generate an intersection (dataset 255B of FIG. 2B) for Party B.

It is to be understood that the searching for a match operation (or an inner join operation, etc.) includes: for each ID field in the dataset 250B (starting from the ID field having the lowest priority level number, up to the ID field having the highest priority level number) and for each identification element in the dataset 250B that matches the identification element in the dataset 250A, removing the record (or row) of the dataset 250B that contains the matched identification element, and adding or appending the removed record (or row) of the dataset 250B to the dataset 255B.

For example, as shown in FIG. 2B, for the ID field id1 in the dataset 250B, the records/rows containing "g", "c", "e" each has a corresponding match in the dataset 250A and such records/rows may be removed from the dataset 250B; and the removed records/rows may be added or appended to the dataset 255B. For id2 in the dataset 250B, the record/row containing "3" has a corresponding match in the dataset 250A and such record/row may be removed from the dataset 250B; and the removed record/row may be added or appended to the dataset 255B.

It is to be understood that the conducting matching logic/algorithm operations may be performed until all ID fields of the dataset 250A are processed for Party A, and/or all ID fields of the dataset 250B are processed for Party B. Processing may proceed from block 230 to block 240.

At block 240 (Generate intersection), the processor of the respective device may generate the intersection/dataset 255A for Party A when all ID fields of the dataset 250A are processed. The processor of the respective device may generate the intersection/dataset 255B for Party B when all ID fields of the dataset 250B are processed. Processing may proceed from block 240 to block 280.

At block 280 (Post-process intersection), the processor of the respective device may process the intersections 255A and/or 255B. It is to be understood that the processes in block 280 are for illustrative purpose only. In an example embodiment, the processor may sort the rows of the intersections 255A and/or 255B, e.g., in ascending or descending order of the first ID field (e.g., ID field having the highest priority or the lowest priority number, etc.) of 255A and/or 255B. It is to be understood that the intersections 255A and/or 255B may be used for further MPC processing such as generating secret shares based on the intersections 255A and/or 255B, gathering secret shares, and/or generating the results by combining gathered secret shares, etc.

Figure 3A:
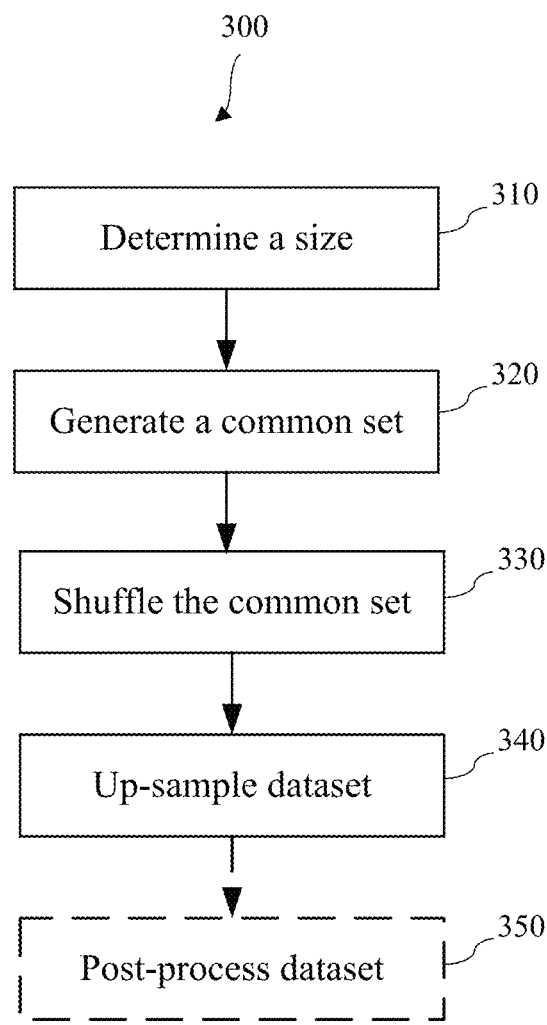
FIG. 3A is a flow chart illustrating an example processing flow for protecting membership privacy in a multi-identification private set intersection operation, in accordance with at least some embodiments described herein.
Figure 3B:
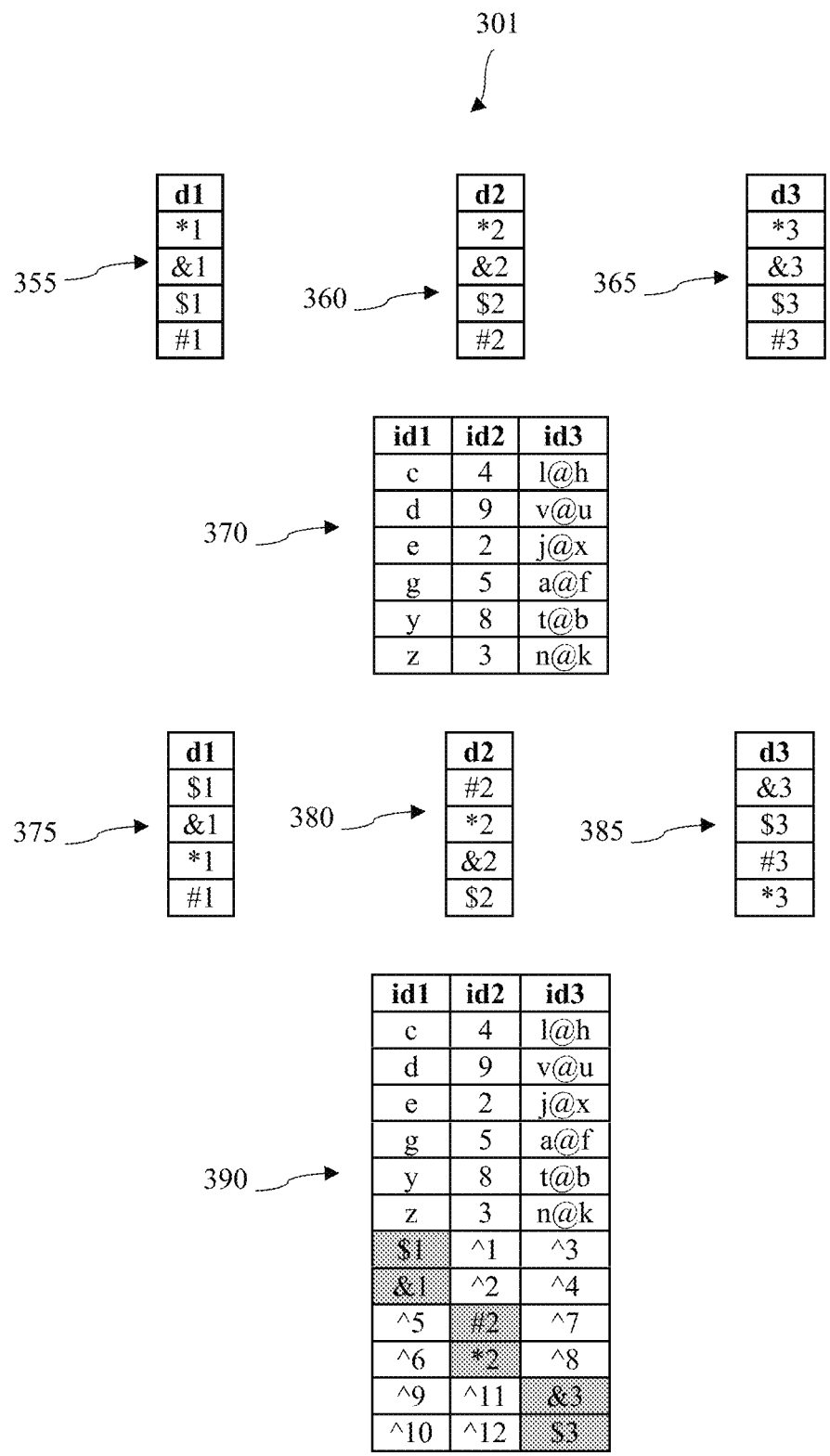
FIG. 3B is a schematic diagram illustrating an example of the processing flow of FIG. 3A, in accordance with at least some embodiments described herein.

FIG. 3A is a flow chart illustrating an example processing flow 300 for protecting membership privacy in a multi-identification private set intersection operation, in accordance with at least some embodiments described herein. FIG. 3B is a schematic diagram 301 illustrating an example of the processing flow of FIG. 3A, in accordance with at least some embodiments described herein.

It is to be understood that the processing flow 300 disclosed herein can be conducted by one or more processors (e.g., the processor of one or more of the terminal device 110, 120, 130, and 140 of FIG. 1, the processor of the server 150 of FIG. 1, the central processor unit 405 of FIG. 4, and/or any other suitable processor), unless otherwise specified.

It is also to be understood that the processing flow 300 can include one or more operations, actions, or functions as illustrated by one or more of blocks 310, 320, 330, 340, and 350. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 300, operations including initializations or the like may be performed. For example, system parameters and/or application parameters may be initialized. Processing flow 300 may begin at block 310.

At block 310 (Determine a size), the processor may determine a size N (i.e., a number) that is to be used for generating padding/filling dataset(s) to achieve a desired data privacy protection goal or performance (described in detail further below). It is to be understood that the size N is to be determined to ensure that a multi-identification privacy configuration and/or privacy requirement is met or satisfied. In an example embodiment, the multi-identification privacy configuration and/or privacy requirement may include configurations and/or requirement(s) (described in details below) defined in a differential privacy protocol or algorithm. Processing may proceed from block 310 to block 320.

At block 320 (Generate a common set), the processor of the respective device may provide a dataset (e.g., 370 of FIG. 3B) for Party A, and/or provide a dataset (i.e., the original dataset before being up-sampled, not shown) for Party B. It is to be understood that the operations or functions described in the processing flow 300 may be symmetrical for Party A and Party B. It is also to be understood that the format, content, and/or arrangement of the datasets described herein are for descriptive purposes only and are not intended to be limiting.

For example, the dataset 370 may have more than one ID field (ID column: id1, id2, and id3) and/or one or more features or attributes (columns, not shown) associated with the ID fields. In an example embodiment, the ID field id1 may represent the user-names, the ID field id2 may represent the phone numbers, and the ID field id3 may represent the e-mail addresses.

For each ID field of dataset 370 (starting from the first ID field to the last ID field), the processor may generate a respective dataset (e.g., 355, 360, or 365 of FIG. 3B). It is to be understood that each of the datasets (355, 360, and 365) may be a padding or filling dataset that is commonly used or shared by both Party A and Party B. In an example embodiment, each of the datasets (355, 360, and 365) has a size of 2*N (see description of block 310). In other example embodiments, each of the datasets (355, 360, and 365) may have a size that is equal to or greater than N.

It is to be understood that a size of the dataset (355, 360, or 365) may refer to the number of records (or rows, elements, etc.) of the dataset (355, 360, or 365). It is also to be understood that when each of the datasets (355, 360, and 365) has a size of 2*N, the subsequent operations such as the multi-identification PSI operations on the up-sampled datasets (e.g., 390 of FIG. 3B for party A and an up-sampled dataset for Party B (not shown), described in detail further below) may guarantee being ($\epsilon$, $\delta$)-differentially private (described and/or defined below) for both Party A and Party B. It is also to be understood that in an example embodiment, "$\epsilon$" may refer to a first privacy parameter, and "$\delta$" may refer to a second privacy parameter. In an example embodiment, $\epsilon$ and/or $\delta$ may be predetermined to achieve a desired multi-identification data privacy protection goal or performance.

In a differential privacy protocol or algorithm, it is to be understood that a privacy-protection mechanism M (e.g., a randomized algorithm, etc.) used in the differential privacy protocol or algorithm may use an input dataset A and a neighboring input dataset A' that differs from A by only one element (e.g., A' has one entry less than A, etc.). The privacy-protection mechanism M may map the input dataset(s) to a real value in an R domain. The privacy-protection mechanism M is deemed as "($\epsilon$, $\delta$)-differentially private" (i.e., differentially private based on the $\epsilon$ and $\delta$), if for any pair of (A, A') and every measurable set E∈R, the probability of (M(A)∈E) is less than or equal to $e^{\epsilon}$×the probability of (M(A')∈E)+$\delta$, where e is the Euler's number.

Features (e.g., the determined size N, etc.) in the embodiments disclosed herein may be "($\epsilon$, $\delta$)-differentially private" (i.e., "differentially private" based on the $\epsilon$ and $\delta$) for the predetermined $\epsilon$ and $\delta$. That is, the size N may be determined based on the predetermined $\epsilon$ and $\delta$, such that being "($\epsilon$, $\delta$)-differentially private" may be achieved for the subsequent operations such as the multi-identification PSI operations on the up-sampled datasets (i.e., the subsequent operations are "differentially private" based on the $\epsilon$ and $\delta$).

It is to be understood that the above configuration or requirement of the differential privacy protocol or algorithm may refer to a measure of "how much data privacy is afforded (e.g., by a query on the input dataset) to perform the operations or functions?" The measurable set E may refer to all potential output of M that may be predicted. The first privacy parameter "$\epsilon$" may refer to a privacy budget (i.e., a limit of how much privacy it is acceptable with leaking), e.g., indicating a maximum distance between a query on dataset A and the same query on dataset A'. The smaller the value of E is, the stronger the privacy protection is for the multi-identification privacy-protection mechanism. The second privacy parameter "$\delta$" may refer to a probability, such as a probability of information being accidentally leaked. In an example embodiment, a required or predetermined value of E may range from at or about 1 to at or about 3. The required or predetermined value of $\delta$ may range from at or about $10^{-10}$ (or at about $10^{-8}$) to at or about $10^{-6}$. To achieve, meet, satisfy, or guarantee the requirement to be ($\epsilon$, $\delta$)-differentially private, the value of N may be at or about a few thousands.

In an example embodiment, the relationship among $\epsilon$, $\delta$, and N (represented as "$\tau$") may be represented by the following algorithms (A1 and A2). That is, the size N may be determined following a pre-calibrated or predetermined noise distribution, e.g., based on the required or predetermined $\epsilon$ and $\delta$, such that being "($\epsilon$, $\delta$)-differentially private" may be achieved for the subsequent operations such as the multi-identification PSI operations on the up-sampled datasets.

In an example embodiment, the output of the algorithm A1 is the size N (represented as "$\tau$"), and the inputs to the algorithm A1 includes (1) the predetermined E and the predetermined $\delta$, (2) the number of ID fields/columns ("L") in the dataset of Party A (e.g., 370 of FIG. 3B) and/or in the dataset of Party B, (3) the total number of multi-identification set intersection operations required or needed or allowed ("K") to determine a result, and (4) any $\tau_{up}$ that guarantees a corresponding $\delta_{up}$ by:

$$\delta_{up}(\epsilon, K) = 1 - \left(1 - \frac{1}{C_{2\tau}^{\tau}}\right)^{K \cdot L} + \sum_{\gamma: \epsilon \leq \gamma < \infty} (1 - e^{\epsilon - \gamma}) P_{\Gamma}(\gamma)^{\circledast (K \cdot L)}$$

satisfying $\delta_{up} < \delta$, where Pr(.) may refer to a probability function, and C may refer to a combination operation (i.e., a selection of items from a data set that has distinct members, such that the order of selection does not matter).

That is, the size N ("$\tau$") may be determined based on the inputs to algorithm A1. Assuming $\tau_{low}$ is initialized as 0, algorithm A1 may be described as: while $\tau_{low} < \tau_{up}$, repeating the (1) setting $\tau' = \lceil \tau_{up} + \tau_{low} \rceil / 2$, (2) determining $\delta'(\epsilon, \tau')$ in algorithm A2, and (3) if $\delta' \geq \delta$, setting $\tau_{low} = \tau'$; else setting $\tau_{up} = \tau'$. At the end of the process (i.e., when $\tau_{low} \geq \tau_{up}$), the algorithm returns $\tau = \tau'$. That is, the number $\tau$ may be determined by executing algorithm A1.

In an example embodiment, the output of algorithm A2 is the privacy parameter $\delta$, and the inputs to algorithm A2 include (1) the size $\tau'$, (2) the total number of multi-identification set intersection operations required or needed or allowed ("K") to determine a result, (3) Fast Fourier Transform (FFT) periodic window size W (e.g., W=600, etc.), and (4) FFT density $n_x$ (e.g., $n_x = 10^6$, etc.). That is, the privacy parameter $\delta$ may be determined based on the inputs to algorithm A2.

In an example embodiment, algorithm A2 may be described as: (1) determining a FFT resolution $\Delta_x = 2 \cdot W/n_x$, (2) initializing the privacy loss distribution vectors as all 0s for vector $\text{Pr}_{\epsilon} \in R$, (3) for $o \in [1, \ldots, \tau - 1]$, updating $P_{\Gamma}[\lceil W + 2 \ln C_{\tau}^{o} - 2 \ln C_{\tau}^{o+1}) / \Delta_x \rceil] = (C_{\tau}^{o})^2 / C_{2\tau}^{\tau}$, (4) determining the convolutions b via FFT: $b = DF^{-1}(F(D \cdot P_{\Gamma})^K)$, where D is defined as $$\begin{bmatrix} 0 & I_{n_x/2} \\ I_{n_x/2} & 0 \end{bmatrix},$$

where I is the unit matrix, (5) determining a starting point $$\gamma_{\epsilon} = \left\lceil \frac{\epsilon + W}{\Delta_x} \right\rceil,$$

and (6) estimating $\delta$ based on $$\delta(\epsilon) = 1 - \left(1 - \frac{1}{C_{2\tau}^{\tau}}\right)^T + \sum_{\gamma = \gamma_{\epsilon}}^{n_x - 1} (1 - e^{\epsilon + W - \gamma \Delta_x}) b[\gamma].$$

In an example embodiment, the size of the dataset 370 for party A, or the size of the original dataset before up-sampled (not shown) for Party B, may be in the range from tens to hundreds of thousands records. That is, compared to the size of the dataset 370 for party A or the original dataset for Party B, the size of the datasets 355, 360, and 365 (e.g., 2*N, etc.) may be at or about 1% or less of the size of the dataset 370 for party A or the original dataset for Party B, and thus the overhead introduced (e.g., by using the datasets 355, 360, and 365 to protect multi-identification membership privacy) may be trivial compared to the size of the dataset 370 for party A or the original dataset for Party B.

It is also to be understood that the datasets 355, 360, and 365 are generated such that the intersection (e.g., a result of an inner join operation) of the dataset 355 and its corresponding ID field (id1) in both the dataset 370 for party A and the original dataset for Party B is empty (i.e., having a size of zero); the intersection of the dataset 360 and its corresponding ID field (id2) in both the dataset 370 for party A and the original dataset for Party B is empty (i.e., having a size of zero); and the intersection of the dataset 365 and its corresponding ID field (id2) in both the dataset 370 for party A and the original dataset for Party B is empty (i.e., having a size of zero). That is, there is no common or shared element between the dataset (355, 360, and 365) and their corresponding ID field in the dataset 370 for party A and in the original dataset for Party B. Processing may proceed from block 320 to block 330.

At block 330 (Shuffle the common set), the processor of the respective device may shuffle (e.g., randomly permute) each of the datasets (355, 360, and 365) independently for Party A and for Party B, to produce a corresponding shuffled dataset (e.g., 375, 380, or 385 of FIG. 3B) for Party A, and to produce a corresponding shuffled dataset (not shown) for Party B. Processing may proceed from block 330 to block 340.

At block 340 (Up-sample dataset), for each ID field (from the first ID field up to the last ID field) in the dataset 370 for Party A and in the original dataset for Party B, the processor of the respective device may up-sample the corresponding ID field in the dataset 370 for Party A and/or in the original dataset for Party B. It is to be understood that the up-sampling of the corresponding ID field in the dataset 370 may include (1) selecting or obtaining the first N elements (or records, rows, etc.) of the respective dataset (375, 380, or 385), and (2) generating a union (resulting the corresponding ID fields in the dataset 390 of FIG. 3B) of the corresponding ID field in the dataset 370 and the first N elements of the respective dataset (375, 380, or 385), and (3) inserting N random numbers/elements into other fields of the dataset 390 that are in the same records/rows as the added/inserted/appended first N elements of the respective dataset (375, 380, or 385).

For example, as shown in FIG. 3B, N is determined to be 2 in block 310. For id1 of the dataset 370, the first N elements (or records, rows, etc.) of the dataset 375 is selected or obtained. A union of the first N elements of the dataset 375 and the id1 field of the dataset 370 is generated to result in the id1 field of the dataset 390. N random numbers/elements are inserted into each of the other fields (id2, id3) of the dataset 390 that are in the same records/rows as the added/inserted/appended first N elements of the dataset 375. It is to be understood that any one of the N random numbers/elements has empty intersection with any other elements in the resultant dataset 390 for Party A, and has empty intersection with any elements in the resultant up-sampled dataset for Party B.

For id2 of the dataset 370, the first N elements (or records, rows, etc.) of the dataset 380 is selected or obtained. A union of the first N elements of the dataset 380 and the id2 field of the dataset 370 (expanded with the inserted 1*N random numbers/elements) is generated to result in the id2 field of the dataset 390. N random numbers/elements are inserted into each of the other fields (id1, id3) of the dataset 390 that are in the same records/rows as the added/inserted/appended first N elements of the dataset 380. It is to be understood that any one of the N random numbers/elements has empty intersection with any other elements in the resultant dataset 390 for Party A, and has empty intersection with any elements in the resultant up-sampled dataset for Party B.

For id3 of the dataset 370, the first N elements (or records, rows, etc.) of the dataset 385 is selected or obtained. A union of the first N elements of the dataset 385 and the id3 field of the dataset 370 (expanded with the inserted 2*N random numbers/elements) is generated to result in the id3 field of the dataset 390. N random numbers/elements are inserted into each of the other fields (id1, id2) of the dataset 390 that are in the same records/rows as the added/inserted/appended first N elements of the dataset 385. It is to be understood that any one of the N random numbers/elements has empty intersection with any other elements in the resultant dataset 390 for Party A, and has empty intersection with any elements in the resultant up-sampled dataset for Party B.

It is also to be understood that the up-sampled dataset 390 may be used as the dataset 250A of FIG. 2B. Similarly, the ID fields of the dataset for Party B may also be up-sampled using independently shuffled dataset (375, 380, and 385, respectively) to generate an up-sampled dataset (e.g., 250B of FIG. 2B). Processing may proceed from block 340 to block 350.

At block 350 (Post-process dataset), the processor of the respective device may process the up-sampled dataset 390 for Party A and/or the up-sampled dataset for Party B, to generate intersections (without revealing the real size of the intersection because of the padding/filling elements and the random numbers/elements being inserted in the up-sampled datasets for Party A and/or Party B) for further process. In an example embodiment, the processes in block 350 may include one or more of the processes described in FIG. 2.

It is to be understood that a size of the intersection of the up-sampled dataset 390 of Party A and the up-sampled dataset (e.g., 250B of FIG. 2B) of Party B does not reveal the intersection size of the original datasets (e.g., 370 for Party A, and the original dataset for Party B) due to the introducing of the datasets (355, 360, 365) and the random numbers/elements for up-sampling. That is, features in the embodiments disclosed herein may lead to the intersection size revealed in the following multi-identification PSI protocol being random and differentially private, making it almost impossible for an attacker to determine a user's membership.

FIG. 4 is a schematic structural diagram of an example computer system 400 applicable to implementing an electronic device (for example, the server or one of the terminal devices shown in FIG. 1), arranged in accordance with at least some embodiments described herein. It is to be understood that the computer system shown in FIG. 4 is provided for illustration only instead of limiting the functions and applications of the embodiments described herein.

As depicted, the computer system 400 may include a central processing unit (CPU) 405. The CPU 405 may perform various operations and processing based on programs stored in a read-only memory (ROM) 410 or programs loaded from a storage device 440 to a random-access memory (RAM) 415. The RAM 415 may also store various data and programs required for operations of the system 400. The CPU 405, the ROM 410, and the RAM 415 may be connected to each other via a bus 420. An input/output (I/O) interface 425 may also be connected to the bus 420.

The components connected to the I/O interface 425 may further include an input device 430 including a keyboard, a mouse, a digital pen, a drawing pad, or the like; an output device 435 including a display such as a liquid crystal display (LCD), a speaker, or the like; a storage device 440 including a hard disk or the like; and a communication device 445 including a network interface card such as a LAN card, a modem, or the like. The communication device 445 may perform communication processing via a network such as the Internet, a WAN, a LAN, a LIN, a cloud, etc. In an embodiment, a driver 450 may also be connected to the I/O interface 425. A removable medium 455 such as a magnetic disk, an optical disk, a magneto-optical disk, a semiconductor memory, or the like may be mounted on the driver 450 as desired, such that a computer program read from the removable medium 455 may be installed in the storage device 440.

It is to be understood that the processes described with reference to the flowchart of FIGS. 2A and 3A and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 445, and/or may be installed from the removable medium 455. The computer program, when being executed by the central processing unit (CPU) 405, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

ASPECTS

It is appreciated that any one of aspects can be combined with each other.

Aspect 1. A method for protecting membership privacy in multi-identification secure computation and communication, the method comprising: providing a first dataset, the first dataset having a first set of membership identifications and a second set of membership identifications; determining a number N based on a data privacy configuration; generating a first padding dataset; shuffling the first padding dataset; up-sampling the first set of membership identifications with a first N elements of the shuffled first padding dataset; inserting a first N random membership-identification elements to the second set of membership identifications; generating a second padding dataset; shuffling the second padding dataset; up-sampling the inserted second set of membership identifications with a first N elements of the shuffled second padding dataset; performing an intersection operation based on the up-sampled first dataset and a received dataset.

Aspect 2. The method of aspect 1, wherein the data privacy configuration includes a first predetermined privacy parameter and a second predetermined privacy parameter, wherein the N is determined such that the intersection operation is differentially private given the first predetermined privacy parameter and the second predetermined privacy parameter.

Aspect 3. The method of aspect 2, wherein the N is determined further based on a number of sets of membership identifications.

Aspect 4. The method of aspect 3, wherein the N is determined further based on a number of intersection operations.

Aspect 5. The method of any one of aspects 1-4, wherein an intersection of the first N random membership-identification elements and any other elements of the first dataset is empty.

Aspect 6. The method of any one of aspects 1-5, wherein the first padding dataset includes 2*N elements, an intersection of the first padding dataset and the first set of membership identifications is empty.

Aspect 7. The method of any one of aspects 1-6, wherein the second padding dataset includes 2*N elements, an intersection of the second padding dataset and the second set of membership identifications is empty.

Aspect 8. The method of any one of aspects 1-7, further comprising: providing a second dataset, the second dataset having a third set of membership identifications and a fourth set of membership identifications; generating a third padding dataset; shuffling the third padding dataset; up-sampling the third set of membership identifications with a first N elements of the shuffled third padding dataset; inserting a second N random membership-identification elements to the fourth set of membership identifications; generating a fourth padding dataset; shuffling the fourth padding dataset; up-sampling the inserted fourth set of membership identifications with a first N elements of the shuffled fourth padding dataset.

Aspect 9. The method of aspect 8, wherein an intersection of the second N random membership-identification elements and any other elements of the second dataset is empty.

Aspect 10. The method of aspect 8 or aspect 9, wherein the third padding dataset includes 2*N elements, an intersection of the third padding dataset and the third set of membership identifications is empty.

Aspect 11. The method of any one of aspects 8-10, wherein the fourth padding dataset includes 2*N elements, an intersection of the fourth padding dataset and the fourth set of membership identifications is empty.

Aspect 12. A membership privacy protection system in multi-identification secure computation and communication, the system comprising: a memory to store a first dataset; a processor to: provide a first dataset, the first dataset having a first set of membership identifications and a second set of membership identifications; determine a number N based on a data privacy configuration; generate a first padding dataset having 2*N elements, wherein an intersection of the first padding dataset and the first set of membership identifications is empty; shuffle the first padding dataset; up-sample the first set of membership identifications with a first N elements of the shuffled first padding dataset; insert a first N random membership-identification elements to the second set of membership identifications; generate a second padding dataset having 2*N elements, wherein an intersection of the second padding dataset and the second set of membership identifications is empty; shuffle the second padding dataset; up-sample the inserted second set of membership identifications with a first N elements of the shuffled second padding dataset; perform an intersection operation based on the up-sampled first dataset and a received dataset.

Aspect 13. The system of aspect 12, wherein the data privacy configuration includes a first predetermined privacy parameter and a second predetermined privacy parameter, wherein the N is determined such that the intersection operation is differentially private given the first predetermined privacy parameter and the second predetermined privacy parameter.

Aspect 14. The system of aspect 13, wherein the N is determined further based on a number of sets of membership identifications.

Aspect 15. The system of aspect 14, wherein the N is determined further based on a number of intersection operations.

Aspect 16. The system of any one of aspects 12-15, wherein an intersection of the first N random membership-identification elements and any other elements of the first dataset is empty.

Aspect 17. The system of any one of aspects 12-16, wherein the processor is to further: provide a second dataset, the second dataset having a third set of membership identifications and a fourth set of membership identifications; generate a third padding dataset having 2*N elements, wherein an intersection of the third padding dataset and the third set of membership identifications is empty; shuffle the third padding dataset; up-sample the third set of membership identifications with a first N elements of the shuffled third padding dataset; insert a second N random membership-identification elements to the fourth set of membership identifications; generate a fourth padding dataset having 2*N elements, wherein an intersection of the fourth padding dataset and the fourth set of membership identifications is empty; shuffle the fourth padding dataset; up-sample the inserted fourth set of membership identifications with a first N elements of the shuffled fourth padding dataset.

Aspect 18. The system of aspect 17, wherein an intersection of the second N random membership-identification elements and any other elements of the second dataset is empty.

Aspect 19. A non-transitory computer-readable medium having computer-executable instructions stored thereon that, upon execution, cause one or more processors to perform operations comprising: providing a first dataset, the first dataset having a first set of membership identifications and a second set of membership identifications, the first set of membership identifications having a priority higher than a priority of the second set of membership identifications; up-sampling the first dataset with a padding dataset; providing a second dataset, the first dataset having a third set of membership identifications and a fourth set of membership identifications, the third set of membership identifications having a priority higher than a priority of the fourth set of membership identifications; up-sampling the second dataset with the padding dataset; for each membership identification in the first set of membership identifications that matches a membership identification in the third set of membership identifications, removing a row containing the matched membership identification from the first dataset and adding the removed row to a first intersection; and for each membership identification in the second set of membership identifications that matches a membership identification in the fourth set of membership identifications, removing a row containing the matched membership identification from the first dataset and adding the removed row to the first intersection.

Aspect 20. The computer-readable medium of aspect 19, the operations further comprise: for each membership identification in the third set of membership identifications that matches a membership identification in the first set of membership identifications, removing a row containing the matched membership identification from the second dataset and adding the removed row to a second intersection; and for each membership identification in the fourth set of membership identifications that matches a membership identification in the second set of membership identifications, removing a row containing the matched membership identification from the second dataset and adding the removed row to the second intersection.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for protecting membership privacy in multi-identification secure computation and communication, the method comprising:
    providing a first dataset, the first dataset having a first set of membership identifications and a second set of membership identifications;
    determining a number N based on a data privacy configuration;
    generating a first padding dataset;
    shuffling the first padding dataset;
    up-sampling the first set of membership identifications with a first N elements of the shuffled first padding dataset;
    inserting a first N random membership-identification elements to the second set of membership identifications;
    generating a second padding dataset;
    shuffling the second padding dataset;
    up-sampling the inserted second set of membership identifications with a first N elements of the shuffled second padding dataset; and
    performing an intersection operation based on the up-sampled first dataset and a received dataset.

2. The method of claim 1, wherein the data privacy configuration includes a first predetermined privacy parameter and a second predetermined privacy parameter,
    wherein the N is determined such that the intersection operation is differentially private given the first predetermined privacy parameter and the second predetermined privacy parameter.

3. The method of claim 2, wherein the N is determined further based on a number of sets of membership identifications.

4. The method of claim 3, wherein the N is determined further based on a number of intersection operations.

5. The method of claim 1, wherein an intersection of the first N random membership-identification elements and any other elements of the first dataset is empty.

6. The method of claim 1, wherein the first padding dataset includes 2*N elements, an intersection of the first padding dataset and the first set of membership identifications is empty.

7. The method of claim 1, wherein the second padding dataset includes 2*N elements, an intersection of the second padding dataset and the second set of membership identifications is empty.

8. The method of claim 1, further comprising:
providing a second dataset, the second dataset having a third set of membership identifications and a fourth set of membership identifications;
generating a third padding dataset;
shuffling the third padding dataset;
up-sampling the third set of membership identifications with a first N elements of the shuffled third padding dataset;
inserting a second N random membership-identification elements to the fourth set of membership identifications;
generating a fourth padding dataset;
shuffling the fourth padding dataset; and
up-sampling the inserted fourth set of membership identifications with a first N elements of the shuffled fourth padding dataset.

9. The method of claim 8, wherein an intersection of the second N random membership-identification elements and any other elements of the second dataset is empty.

10. The method of claim 8, wherein the third padding dataset includes 2*N elements, an intersection of the third padding dataset and the third set of membership identifications is empty.

11. The method of claim 8, wherein the fourth padding dataset includes 2*N elements, an intersection of the fourth padding dataset and the fourth set of membership identifications is empty.

12. A membership privacy protection system in multi-identification secure computation and communication, the system comprising:
a memory to store a first dataset; and
a processor to:
provide a first dataset, the first dataset having a first set of membership identifications and a second set of membership identifications;
determine a number N based on a data privacy configuration;
generate a first padding dataset having 2*N elements, wherein an intersection of the first padding dataset and the first set of membership identifications is empty;
shuffle the first padding dataset;
up-sample the first set of membership identifications with a first N elements of the shuffled first padding dataset;
insert a first N random membership-identification elements to the second set of membership identifications;
generate a second padding dataset having 2*N elements, wherein an intersection of the second padding dataset and the second set of membership identifications is empty;
shuffle the second padding dataset;
up-sample the inserted second set of membership identifications with a first N elements of the shuffled second padding dataset; and
perform an intersection operation based on the up-sampled first dataset and a received dataset.

13. The system of claim 12, wherein the data privacy configuration includes a first predetermined privacy parameter and a second predetermined privacy parameter,
wherein the N is determined such that the intersection operation is differentially private given the first predetermined privacy parameter and the second predetermined privacy parameter.

14. The system of claim 13, wherein the N is determined further based on a number of sets of membership identifications.

15. The system of claim 14, wherein the N is determined further based on a number of intersection operations.

16. The system of claim 12, wherein an intersection of the first N random membership-identification elements and any other elements of the first dataset is empty.

17. The system of claim 12, wherein the processor is to further:
provide a second dataset, the second dataset having a third set of membership identifications and a fourth set of membership identifications;
generate a third padding dataset having 2*N elements, wherein an intersection of the third padding dataset and the third set of membership identifications is empty;
shuffle the third padding dataset;
up-sample the third set of membership identifications with a first N elements of the shuffled third padding dataset;
insert a second N random membership-identification elements to the fourth set of membership identifications;
generate a fourth padding dataset having 2*N elements, wherein an intersection of the fourth padding dataset and the fourth set of membership identifications is empty;
shuffle the fourth padding dataset; and
up-sample the inserted fourth set of membership identifications with a first N elements of the shuffled fourth padding dataset.

18. The system of claim 17, wherein an intersection of the second N random membership-identification elements and any other elements of the second dataset is empty.

19. A non-transitory computer-readable medium having computer-executable instructions stored thereon that, upon execution, cause one or more processors to perform operations comprising:
providing a first dataset, the first dataset having a first set of membership identifications and a second set of membership identifications, the first set of membership identifications having a priority higher than a priority of the second set of membership identifications;
up-sampling the first dataset with a padding dataset;
providing a second dataset, the second dataset having a third set of membership identifications and a fourth set of membership identifications, the third set of membership identifications having a priority higher than a priority of the fourth set of membership identifications;
up-sampling the second dataset with the padding dataset;
for each membership identification in the first set of membership identifications that matches a membership identification in the third set of membership identifications, removing a row containing the matched membership identification from the first dataset and adding the removed row to a first intersection; and for each membership identification in the second set of membership identifications that matches a membership identification in the fourth set of membership identifications, removing a row containing the matched membership identification from the first dataset and adding the removed row to the first intersection.

20. The computer-readable medium of claim 19, the operations further comprise:

for each membership identification in the third set of membership identifications that matches a membership identification in the first set of membership identifications, removing a row containing the matched membership identification from the second dataset and adding the removed row to a second intersection; and for each membership identification in the fourth set of membership identifications that matches a membership identification in the second set of membership identifications, removing a row containing the matched membership identification from the second dataset and adding the removed row to the second intersection.

* * * * *